March 21, 1950 K. W. HALL 2,501,329
THERMO-INJECTING MOLDING PROCESS
Filed May 23, 1946 5 Sheets-Sheet 3
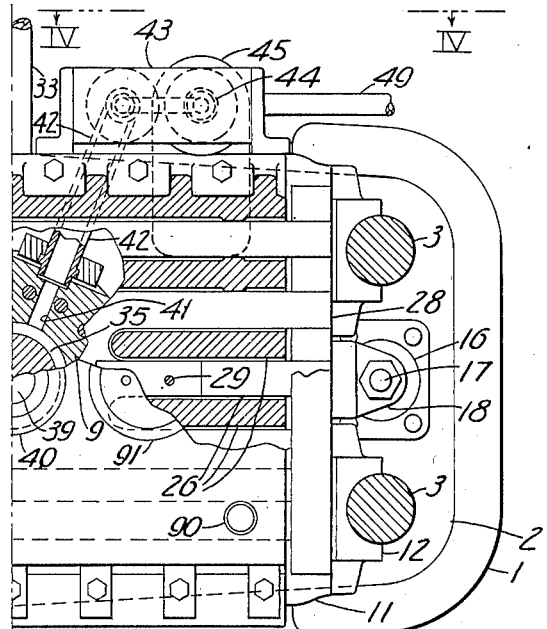

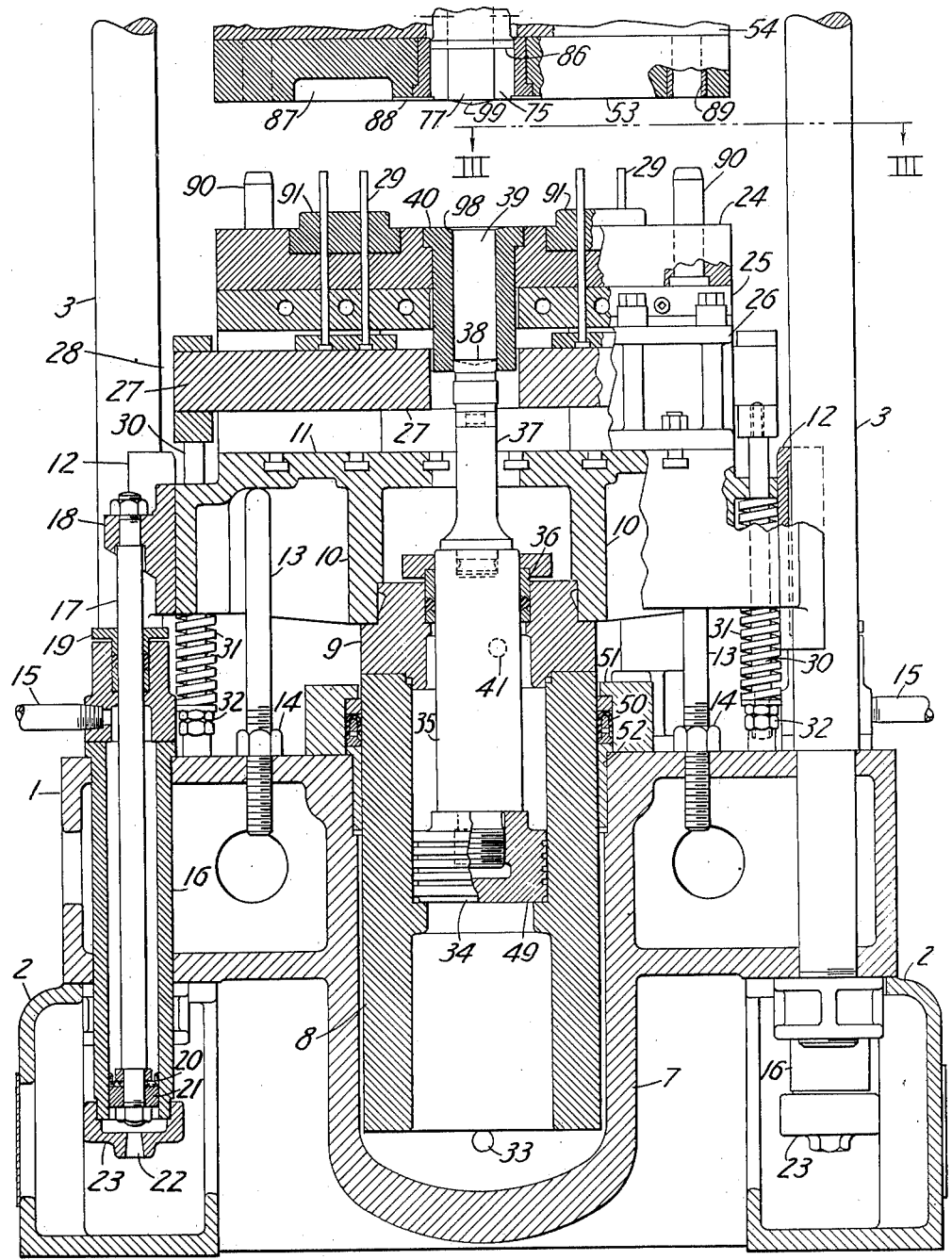
Fig. I
INVENTOR.
Keith W. Hall
BY
Marshall and Marshall
ATTORNEYS

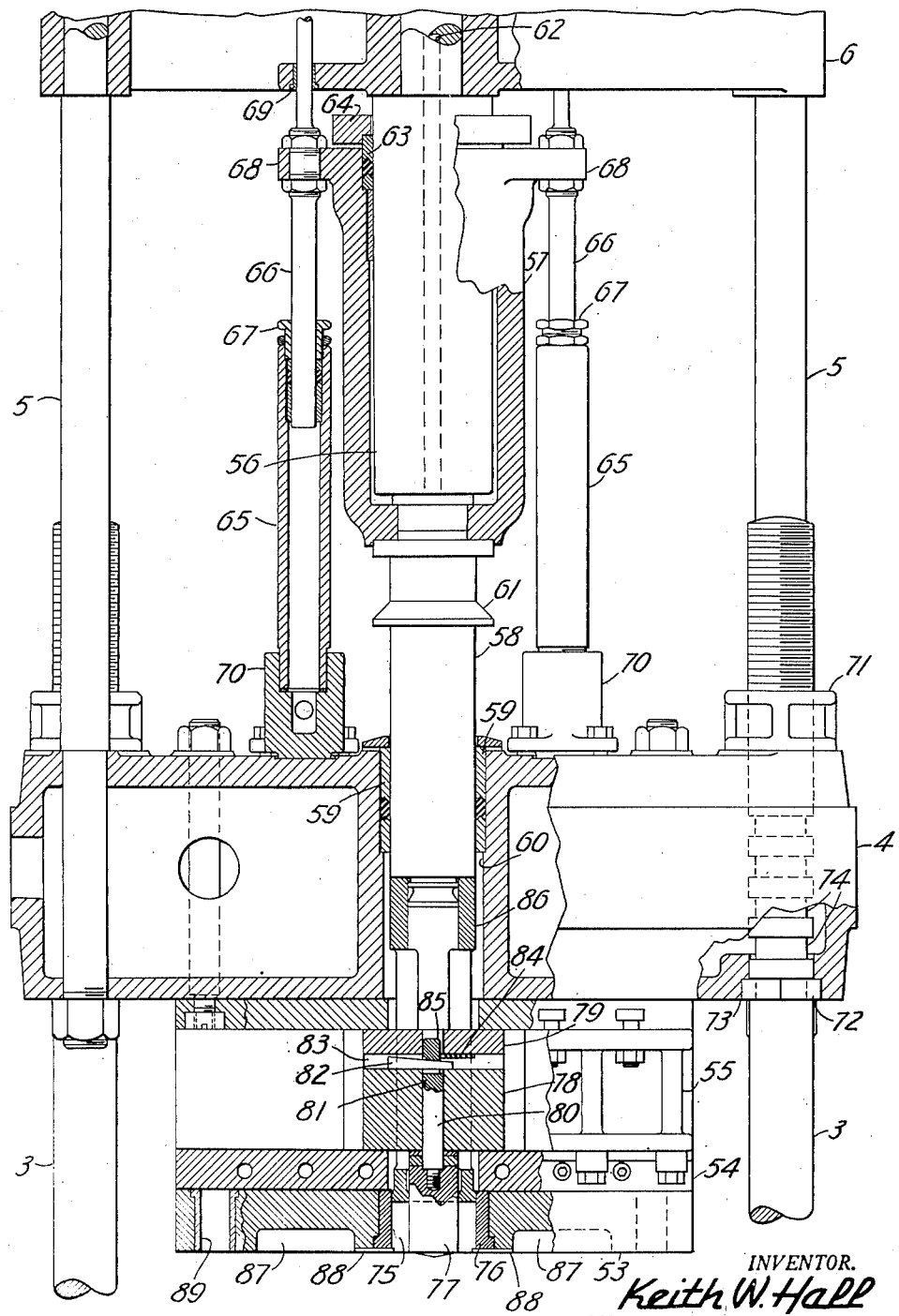

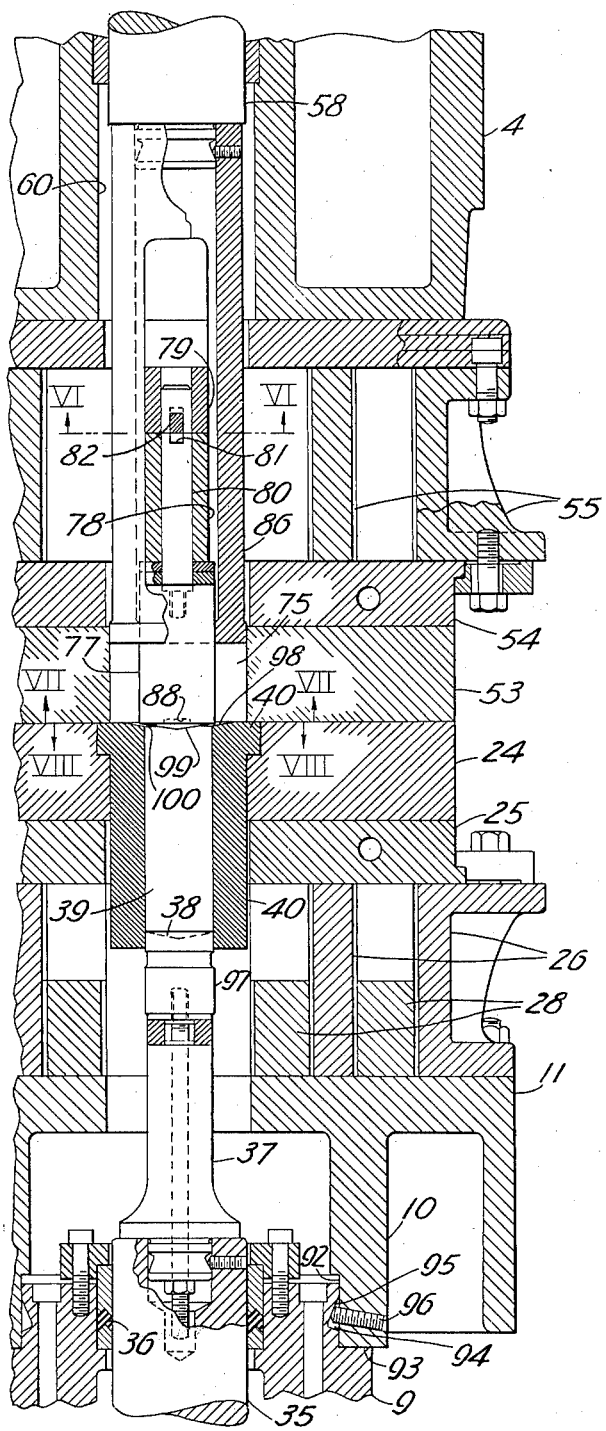
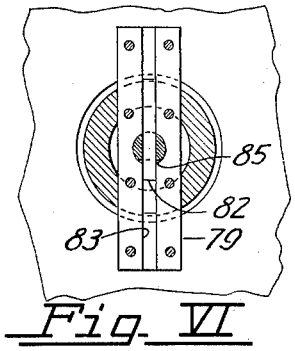
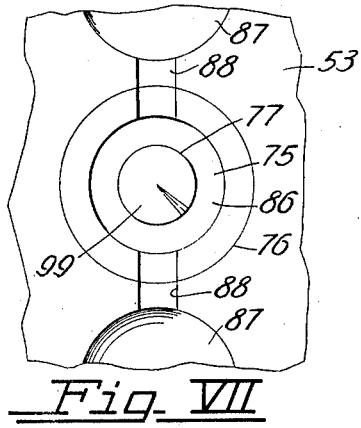
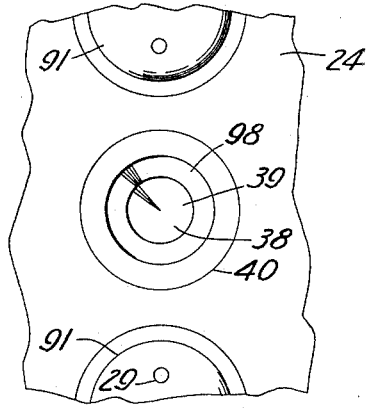
Fig. V
Fig. VI
Fig. VII
Fig. VIII
INVENTOR.
Keith W. Hall
BY
Marshall and Marshall
ATTORNEYS

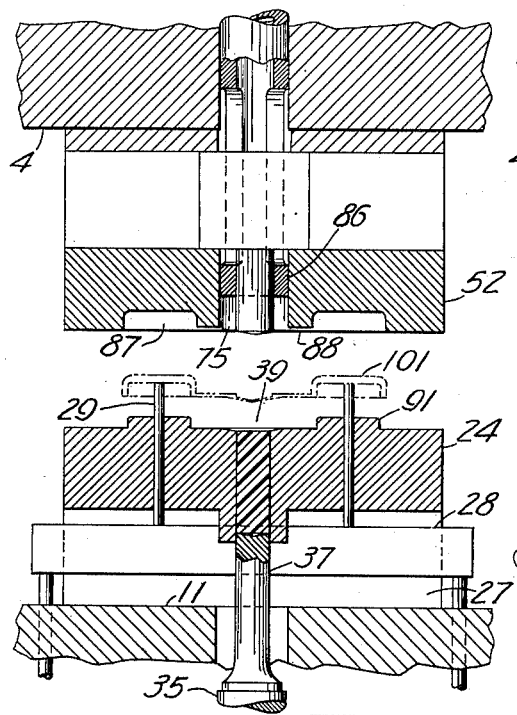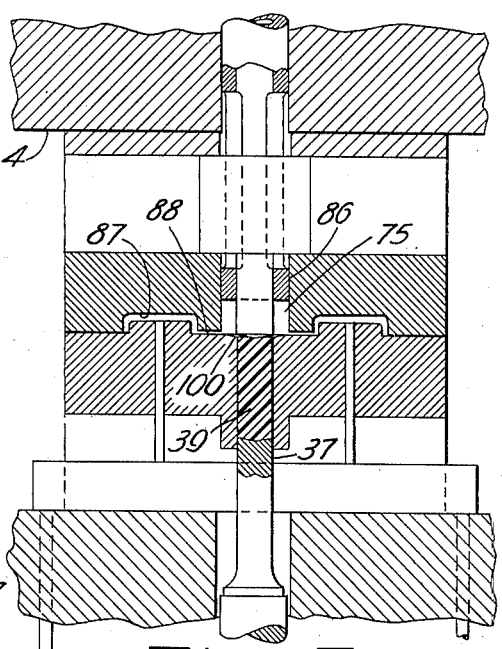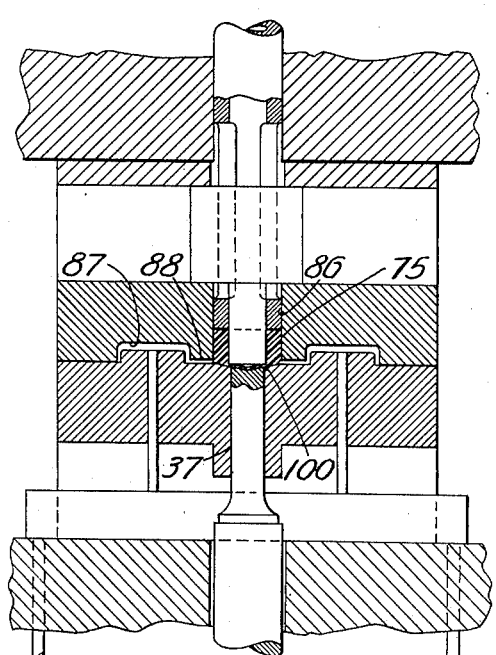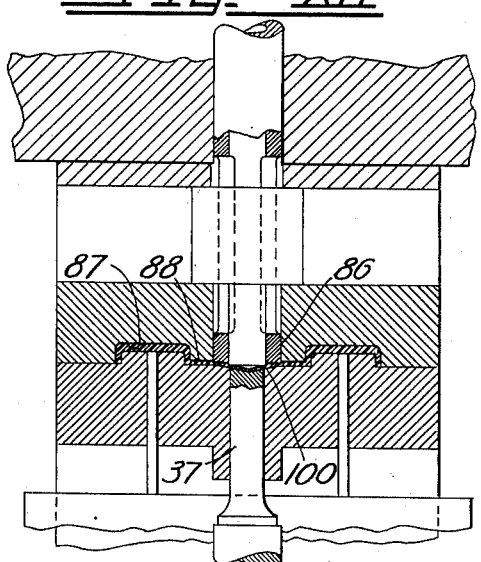

Patented Mar. 21, 1950

2,501,329

UNITED STATES PATENT OFFICE 2,501,329

THERMO-INJECTING MOLDING PROCESS

Keith W. Hall, Toledo, Ohio, assignor, by mesne assignments, to The Baldwin Locomotive Works, a corporation of Pennsylvania Application May 23, 1946, Serial No. 671,819

5 Claims. (Cl. 18—30)

This invention relates to the molding of plastic materials and in particular to an improved method of heating the material prior to injecting it into a molding cavity.

Plastic materials are molded by any of several processes depending upon the characteristics of the material. Thermoplastic materials are usually injection molded in a machine having an injection cylinder, a nozzle, and a mold or die. In a typical injection molding process the material to be molded is fed into the injection cylinder where it is heated until it becomes soft enough to be forced through the nozzle and into the die. The die is kept cold so that the material hardens while it is confined in the cavities of the mold. The die is then opened, the molded pieces removed, and the die reclosed in preparation for the next cycle. This process is satisfactory for most thermoplastic materials although there are some which tend to deteriorate if they are subjected to high temperatures for too great a length of time.

Thermosetting materials, because of their different characteristics, require entirely different molding processes. These materials are usually compression molded, i. e. a heated pellet or preform of the material is placed in a cavity of the die and the die is closed under high pressure so that the preform is molded to the contour of the cavity. The temperature of the mold is maintained high enough so that the material is substantially cured or hardened before the mold is opened and the piece is removed.

Thermosetting materials are also molded by what is known as a "transfer process." In this process the material is preheated until it is soft enough to flow under pressure and is then placed in a transfer pot from which it is forced through a nozzle and runners into the mold cavities. The mold is held closed until the material has hardened and is then opened and the molded pieces and the material left in the runners and the transfer pot are removed.

In either process for molding thermosetting materials, the material must be preheated until it is soft enough to flow under pressure. The length of time that the material may be held in the heated condition before it starts to harden is limited. This critical characteristic of the material is one of the major difficulties encountered in either compression molding or transfer molding.

The principal object of this invention is to provide a process for molding plastic materials in which the material is held at high temperatures for a minimum length of time.

Another object of the invention is to provide a molding process in which pressure energy is used to heat the material.

Another object of the invention is to provide a molding process in which the final heating of the material is accomplished within the press and closely adjacent to the mold cavities.

Another object of the invention is to provide a molding process in which the final stage of heating of the material is applied uniformly to all of the material of the particular charge without overheating any portion or failing to heat any other portion.

A further object of the invention is to provide a novel hydraulic press for molding plastic materials.

A still further object of the invention is to provide a press for molding plastic materials which press converts pressure energy into heat energy in the plastic material to raise the temperature of the plastic material immediately prior to injecting it into the mold cavities.

An ancillary object is to provide a method of quickly heating plastic material that permits the energy used for heating to be accumulated during a major part of the time and rapidly transferred to the material during a comparatively short period of time.

The invention consists in a method of heating plastic material preparatory to molding the material that comprises passing the material from a region of high pressure to a region of low pressure through a restricted passage of sufficiently great length and sufficiently small cross section that the pressure energy of the material is converted to heat.

The improved process for molding plastic materials consists of the steps of heating the material to a temperature near but below its critical temperature, placing it in a compression chamber of the molding press, forcing the material under high pressure through a small orifice, which preferably is an annular slit whose length in the direction of flow is great enough so that the frictional resistance to flow raises the temperature of the material into its critical range, and injecting the material into the mold cavities. The last step of the process, consisting of injecting the heated material into the cavities of the mold, may occur subsequent to or simultaneously with the preceding step.

This process is advantageous with thermoplastic materials because it very materially reduces the time during which the material is held at an elevated temperature. When using thermosetting materials such as the phenol- or urea-formaldehyde synthetic resins or similar materials the process reduces and standardizes the time during which the material is held in a critical temperature range. This standardizing of the time reduces to a minimum the chances of producing inferior molded products.

The improved process promotes very uniform heating of the material because every small portion of the material is subjected to substantially the same heating condition as any other small portion of the material regardless of its location in the original preform or pellet of material. Such uniform heating is practically impossible to attain by the use of either an oven or a high frequency electrical heating process.

The improved molding press operating according to the invention has a material receiving chamber into which material may be deposited. When the mold is closed a rigid member in one mold half cooperates with the mouth of the chamber to provide a thin annular orifice through which the material is forced into a second chamber. A second plunger then forces the material from the second chamber into the mold cavities. With some materials and with adequate control of the speed of the first plunger the material may be transferred directly to the mold cavities.

A hydraulic molding press constructed to operate according to the invention is shown in the accompanying drawings.

In the drawings:

Figure I is a vertical section of the lower portion of a hydraulic press constructed according to the invention.

Figure II is a front elevation partly in section and with parts broken away of the upper portion of the hydraulic press.

Figure III is a fragmentary plan of parts broken away and parts shown in section as seen from the line III—III of Figure I.

Figure IV is a fragmentary vertical elevation as seen from the line IV—IV of Figure III.

Figure V is a fragmentary vertical section at an enlarged scale of the plastic material contacting portions of the improved press.

Figure VI is a fragmentary horizontal section taken substantially along the line VI—VI of Figure V.

Figure VII is a fragmentary horizontal section looking up against the bottom of the upper mold half as seen from the line VII—VII of Figure V.

Figure VIII is a fragmentary section looking down on the top of the lower mold half as seen from the line VIII—VIII of Figure V.

Figure IX is a fragmentary vertical section of the molding dies and associated portions of the press in the positions occupied when the press is open.

Figure X is similar to Figure IX except that the mold is closed and the material has not been transferred through the heating orifice.

Figure XI shows the position of the parts after the material has been forced through the heating orifice.

Figure XII shows the position of the parts after the material has been injected into the mold cavities.

These specific figures and the accompanying detailed description of the process and the apparatus are intended merely to illustrate the invention and not to impose limitations on the claims.

A hydraulic press constructed according to the invention has a frame consisting of a main base 1 which is supported on a pair of sub-bases 2. Tie rods 3 one extending upwardly from each corner of the base 1 support an intermediate head 4 (Figure II). A pair of tie rods 5 seated in the intermediate head 4 extend upwardly to support an upper head 6.

The main base 1 is a large cored casting having a cylindrical cup-shaped well 7 at its center.

The well 7 is open at the top and receives a tubular piston 8 which on its upper end is closed by an annular cap 9 which in turn engages a circular rib 10 formed as part of a press platen 11. The platen 11 has laterally extending semicircular shoes 12 which, by engaging the tie rods 3, guide the platen 11 throughout its vertical travel. Stops in the form of posts 13 threaded into the upper surface of the main base 1 and locked in adjusted position by nuts 14 limit the downward movement of the platen 11 as it is drawn downwardly by the force of hydraulic fluid admitted through pipes 15 into pull-down cylinders 16 mounted in the base 1. Piston rods 17 of the pull-down cylinders 16 are secured in ears 18 protruding from the sides of the platen 11 between the semicircular shoes 12. Leakage of hydraulic fluid along the piston rods 17 is prevented by ordinary packing nuts 19, while cup packings 20 prevent appreciable leakage past pistons 21 secured to the bottom ends of the piston rods 17. Any leakage past the cup packings 20 and the pistons 21 is drained from the cylinders 16 through holes 22 drilled in caps 23 which close the bottom ends of the cylinders 16.

A lower mold half 24 rests on a steam plate 25 which in turn is supported from the platen 11 by a supporting grid 26. The bars of the supporting grid 26 are spaced so that cross bars 27 of an ejector grid 28 may operate between them to actuate a series of ejector pins 29. The ejector grid 28 is raised with respect to the platen 11 and lower mold half 24 when its depending actuating rods 30 strike the upper surface of the base 1. The ejector grid is urged downwardly against the upper surface of the platen 11 by coiled springs 31 circumjacently mounted on the actuating rods 30. The coil springs 31 are held compressed between nuts 32 on the bottom ends of the actuating rods 30 and the lower surface of the platen 11. Being actuated in this manner the ejector pins 29 are automatically raised when the platen and lower mold reach the bottom end of their travel and are retracted as soon as the platen starts its upper travel for the next molding cycle.

Hydraulic fluid for raising the platen is admitted into the cup-shaped well 7 through an opening 33 in its side wall below the lowermost position of the tubular piston 8. The hydraulic fluid acts against the bottom end of the tubular piston and against the bottom end of a plunger piston 34 slidably mounted in the upper portion of the tubular piston 8. The plunger piston 34 drives a plunger 35 that extends upwardly through a packing 36 in the annular cap 9 and drives a ram 37. The ram 37 is formed with a concave conical face 38 which forms the bottom of a first compression chamber 39 whose side walls are formed by an open-ended thick-walled cylinder 40 corresponding to an ordinary transfer molding pot. The cylinder 40 is set into the lower mold half with its upper end flush with the upper surface of the mold.

The plunger piston 34 and the plunger 35 are moved with respect to the tubular piston 8 by varying the pressure differential of hydraulic fluid acting on opposite sides of the piston 34. Hydraulic fluid is admitted to the space surrounding the plunger 35 and above the piston 34 through an opening 41 which communicates with a pipe 42 (Figures III and IV) connected into a transfer block 43. A pipe 44 extends downwardly from the transfer block 43 through a cylinder 45 mounted on the base 1. Fluid tight seals 46 sliding on the pipe 44 close the ends of the cylinder 45. A transverse hole 47 is drilled in the pipe 44 at a point such that it is located between the seals 46 throughout the travel of the platen 11 with respect to the frame of the press. Hydraulic fluid that is admitted through a pipe 48 into the space within the cylinder 45 flows through the transverse hole 47, the pipe 44, the transfer block 43, and the pipe 42 into the space within the tubular piston 8 above the plunger piston 34. The application of hydraulic pressure to this system does not tend to produce motion of the lower platen 11 because the pipe 44 is of constant diameter and slides through each end of the cylinder 45. The hydraulic pressure applied to the upper face of the plunger piston 34 tends to hold it down against an inwardly directed shoulder 49 located about half way down the length of the tubular piston 8.

In the operation of the press the material to be processed is placed in the chamber 39 while the mold is open. The mold is then closed without ejecting the material from the chamber 39, by applying high pressure above the piston 34 and applying low pressure through the opening 33 into the space beneath the tubular piston 8 and the plunger piston 34. The high pressure is sufficient to hold the piston plunger 34 against the shoulder 49 so that the mold closes before the material is ejected from the chamber 39.

After the mold has been closed and it is desired to eject the material from the chamber 39 high pressure is applied beneath the tubular piston 8 after the space above the piston has been opened to a return line. The high pressure acting against the lower face of the tubular piston 8 holds the mold tightly closed while the same pressure acting against the lower face of the plunger piston 34 drives the ram 37 upwardly to eject the material from the chamber 39. Leakage of hydraulic fluid from the chamber beneath the tubular piston 8 is prevented by a U-shaped annular packing 50 held in place by a retainer 51. The packing 50 is mounted in the stationary portion of the base 1 rather than on the tubular piston 8, because it is much easier to machine and finish the exterior of the piston than it is to accurately machine the interior of the cup-shaped well 7. In the construction shown in Figure I the cup-shaped well 7 may be a plain casting and is only machined at its upper lip to receive a guide bushing 52.

At the end of the molding cycle the ram 37 is retracted and the platen 11 is lowered by applying high pressure hydraulic fluid to the pullback cylinders 16 and to the interior of the tubular piston 8 above the plunger piston 34, while the space beneath the tubular piston 8 is connected to the return line.

An upper mold half 53 (Figure II) is supported from the lower surface of an upper steam plate 54 which is attached to the lower surface of a grid 55 secured against the underside of the intermediate head 4. A stationary piston 56 depending from the upper head 6 is surrounded by a movable cylinder 57 whose lower end is connected to an upper plunger 58. The plunger 58 is guided through a bushing 59 set in the upper end of a hole 60 extending vertically through the center of the intermediate head 4. A collar 61, an integral part of the plunger 58, by striking the upper end of the bushing 59 limits the downward travel of the plunger 58 and the cylinder 57. Hydraulic fluid is admitted to and withdrawn from the movable cylinder 57 through an axial passage 62 leading down through the stationary piston 56.

The upper end of the movable cylinder 57 is provided with a packing 63 held in place by a retainer 64 which packing slides on the exterior of the stationary piston 56. The movable cylinder 57 is returned to its upper position by a pair of push-back cylinders 65 whose piston rods 66 extend upwardly through packings 67 and are secured in ears 68 projecting laterally from the upper end of the movable cylinder 57. The piston rods 66 are extended upwardly past the ears 68 and are guided in bushings 69 set in the upper head 6. The lower ends of the push-back cylinders 65 are set in cylinder footings 70 mounted on the upper surface of the intermediate head 4 and are provided with connections to the hydraulic system.

The height of the intermediate head 4, with respect to the main base 1 may be adjusted by loosening tie rod nuts 71 threaded on the upper ends of the tie rods 3 sufficiently so that the head may be raised either manually or by the platen 11 until split washers 72 are released from counterbores 73 in the lower surface of the intermediate head 4. The split washers 72 are then placed in those of the grooves 74 corresponding to the desired height adjustment after which the head is lowered against the split washers and the nuts 71 are retightened.

A second compression chamber or transfer chamber 75 is located in the center of the upper mold half 53. The transfer chamber 75 is annular in form with its outer walls formed by a sleeve 76 firmly set in the upper mold half 53. The inner walls of the annular chamber 75 are formed by a core 77 which depends from stacked bridging blocks 78 and 79 held between the steam plate 54 and the lower face of the intermediate head 4. The core 77 is held by a stud 80 whose upper end has a transverse hole 81 to receive a wedge 82 lying in a groove 83. The stacked bridging blocks 78 and 79 permit the groove 83 to be cut entirely from the lower face of the upper block 79 for convenience in manufacture and also to allow a guide plate 84 placed in the top of the groove to engage a flat on the upper end of the stud 80 so that the transverse hole 81 in the stud 80 will be positively aligned with the groove 83 when the core 77 is pushed up into position.

An annular plunger or upper ram 86 mounted on the lower end of the upper plunger 58 forms the upper end of the annular transfer chamber 75 and operates to force material from the chamber. The upper ram 86 is slotted through the greater part of its length to straddle the stacked bridging blocks 78 and 79.

The transfer chamber 75 is connected to mold cavities 87 by means of short runners 88 cut in the lower face of the upper mold half 53. The upper mold half also contains a set of locating bushings 89 which engage locating pins 90 of the lower mold half when the mold is closed. While not shown in the drawings, an ejector grid and ejecting pins may be mounted in the upper grid 55 and actuated by tie rods extending through and engaging the platen 11 at the lower end of its stroke.

The lower mold half 24 is provided with inserts 91 whose upper surfaces are shaped to cooperate with the cavities 87 in determining the shape of the molded pieces.

The lower portion of Figure V illustrates the method of connecting the plungers and rams to secure a tight, accurately aligned connection. Thus the circular rib 10 of the platen 11 has a counterbore 92 into which a reduced diameter portion of the cap 9 is fitted. The lower face of the annular rib 10 rests on a shoulder 93 which serves to transmit force from the annular cap 9 to the annular rib 10. A groove 94 cut in the reduced diameter portion of the cap 9 has a sloping side 95 which is engaged by a locking screw 96. The slope of the side 95 of the groove causes the screw 96 to draw the annular cap 9 securely against the lower surface of the annular rib 10. The other joints between plungers and rams are similarly constructed.

The ram 37 is made in two parts with its upper part 97 replaceable so that the size of the first compression chamber 39 may be changed without replacing the ram 37 in its entirety.

The upper end of the thick walled cylinder 40 forming the sides of the first compression chamber 39 is beveled to form a shallow conical surface 98 which cooperates with the conical lower surface 99 of the core 77 to form a thin annular orifice 100 leading from the first compression chamber 39 into the second or annular compression chamber 75. The compression or transfer chamber 75 is connected through the runners 88 to the mold cavities 87.

It should be noted that the orifice 100 is formed between members mounted from the upper and lower parts of the press so that it is formed only when the press is closed.

The various steps in molding an article are illustrated in Figures IX and XII. In Figure IX the press is illustrated in open position, that is, with high pressure applied to the upper pushback cylinders 65 to raise the annular upper ram 86 and to the lower pull-back cylinders 16 and above the plunger piston 34 so that the platen 11 and the ram 37 are retracted to their lowermost positions and the ejector grid 28 is raised to lift a previously molded piece 101 from the inserts 91. When the press is in this position and after the previously molded piece 101 has been removed, a new charge of material is placed in the first compression chamber 39.

The mold is then closed in the position shown in Figure X by applying low pressure under the tubular piston 8 to raise the platen 11 while maintaining the high pressure above the plunger piston 34. At this point the material is still contained within the first compression chamber 39. The next step, the transfer of the material from the compression chamber 39 into the transfer chamber 75, may follow immediately. This step is effected by relieving the high pressure above the piston 34 and then applying high pressure under it so that the ram 37 extrudes the material through the orifice 100 into the chamber 75. The work done on the material in overcoming the friction encountered in extruding the material through the orifice heats the material sufficiently to bring it into the curing temperature range of thermosetting materials. Figure XI illustrates the position of the parts after the extrusion and heating step has been completed. The energy for this extrusion and heating step is obtained from a high pressure accumulator that has been charged during the preceding time interval when there was no demand for high pressure fluid and that is connected to the press through a conduit that offers little or no resistance to flow. Thus, the rapid heating is obtained without throwing a high short-time load on the power source.

The third and last step in the process following immediately after the completion of the second or extrusion step or occurring simultaneously therewith consists of applying medium or high pressure to the movable cylinder 57 so that the annular ram 86 transfers the material from the transfer chamber 75 through the runners 88 into the mold cavities 87. Figure XII illustrates the position of the parts as the last step is completed.

The thin annular orifice 100 formed between the upper conical surface 98 of the thick walled cylinder 40 and the juxtaposed conical bottom surface 99 of the core 77 is of sufficiently great length in the direction of flow of the material and is of sufficiently small cross-sectional area that a high pressure differential between the compression chamber 39 and the transfer chamber 75 is required to force the material through the orifice. A considerable amount of work is done on the material in forcing it through the orifice and the energy represented by this work is converted into heat energy in the material. The effect of the extrusion is to further plasticize the material by mechanical work and to heat the material to a considerably higher temperature. This heating is very uniform throughout the material because it is applied successively to small portions of the material as they pass through the orifice with the result that every portion of the material receives substantially the same treatment as every other portion. It is impossible to secure such a uniformity of heating by either the oven method or the radio frequency heating method. In the oven method the heat is transmitted into the material by conduction and it is therefore impossible to raise the temperature of the center of the mass of the material without heating the surface of the material to a higher temperature. The low heat conductivity of most plastic materials makes the oven method of heating very slow and unsatisfactory. Radio frequency heating, while better than the oven method, depends for uniformity of heating upon securing a uniform electrical field and upon uniform physical characteristics of the pellet. Therefore neither of these methods can give the uniformity of heating obtained by the extrusion method, nor do they provide any mechanical working of the material to improve its flow characteristics. Neither of them permits the rapid heating accomplished by the extrusion method. The oven method is limited by the low heat conductivity of the material and low permissible surface temperature, while the radio frequency method is limited to the field strength that may be obtained without dielectric breakdown.

The extrusion process of heating also aids in degassing the plastic material. As the material is forced through the thin annular orifice and is heated by the intermolecular friction, any gases or vapors in the material are liberated and because of the extremely thin section at the discharge side of the orifice are freed from the material and allowed to pass to the top of the annular chamber and to escape through the clearance between the walls of the annular chamber and the annular ram. By eliminating the gas before the material is transferred into the mold cavities it is possible materially to reduce the porosity of the finished molded article.

The extrusion process of heating offers advantages in the control that may be exercised over the heating. Thus the pressure and velocity of the ram may be varied throughout the stroke to give different degrees of heat to the various portions of the charge. This makes it possible to heat the last part of the charge more than the first part so that both parts of the charge complete the hardening process simultaneously.

Another advantage afforded by extrusion heating is the possibility of molding in a cool die. The material, because it is held at high temperatures for such a short length of time, may be heated to a higher temperature than in conventional processes and injected into a cool die. The cool surfaces immediately lower the temperature of the contacting material, thus retarding its polymerization or hardening, while the core of the material, still being at the higher temperature, hardens more rapidly. Hardening from the inside out gives a more uniform structure, higher density and a better surface to the part because high pressure may be maintained in the die cavity until the part has completely hardened.

It is not necessary that the upper cylinder and the annular ram be at the top of their stroke at the start of the extrusion cycle. It is desirable under certain conditions that the ram be at its lower position and that it be pushed upwardly against a small back pressure by the material coming into the transfer chamber from the annular orifice. This makes it possible to secure a constant pressure drop across the annular orifice throughout the extrusion cycle.

With some materials the effect of the heating and working produced in the orifice leaves the material so plastic that a small pressure causes it to flow through the runners and into the mold cavities. With these materails it is often desirable to start the transfer from the transfer cylinder to the mold cavities as soon as a substantial fraction of the total charge has been forced into the transfer chamber. This type of operation is possible only if the pressure required to transfer the material is low in comparison to the pressure differential across the annular orifice.

In either event a high pressure is developed in the annular transfer chamber 75 at the end of the transfer portion of the cycle to insure that the mold cavities are completely filled.

The use of the transfer chamber as an intermediate step in the processing of the material gives much better control than any restriction in the runners or an orifice between the compression chamber and mold cavities would be able to give. This is because the speed with which material may be fed to a mold cavity is limited by the characteristics of the material and the fact that the back pressure of the mold cavity increases as the cavity is filled. The transfer chamber 75 acts as an accumulator to prevent any building up of back pressure in the mold from interferring with the discharge of material through the orifice. The accumulator action of the transfer chamber also allows the exercise of independent control of the speed with which the material is forced through the orifice and the speed with which the material is transferred into the mold cavities.

Some materials are rendered so fluid by the heating and working through the orifice that they flow very readily. With these materials and with suitable control of the pressure and velocity of the plunger it is feasible to lock the transfer plunger at the bottom of its stroke and inject directly into the mold. If the transfer plunger is stationery it can be a part of the upper die and the press functions in the same manner as a jet molding press. In this method of operation the material is passed through the orifice rapidly until just before the mold cavities are filled, then the pressure and velocity are dropped until the cavity is completely filled, and finally high pressure is applied to ensure complete filling of the cavities. The last high pressure does not heat the material in the nozzle because of the back pressure of the mold which prevents any flow of material. In this cycle of operation the material in the runners has not been heated as much as the rest and therefore does not harden until after it is transferred to the mold cavity on the next cycle.

The extrusion heating of plastic material may also be used with the thermoplastic materials. Some of these materials tend to deteriorate rapidly when they are heated to temperatures at which they soften. By reducing the time during which they are held in the softened stage (the time that they are in the transfer chamber) to a minimum the quality of the molded product is correspondingly improved.

The process of molding, including the step of heating the material by extruding it through an orifice, may be carried out by various forms of apparatus other than the particular press described and shown in the accompanying drawings. Likewise many modifications of the press may be made without departing from the spirit and scope of the invention.

Having described my invention, I claim:

1. In an apparatus for molding plastic material, in combination, a pair of relatively movable members, said members having molding cavities formed in their juxtaposed surfaces, a cylinder in a first of the members for receiving material to be heated, a ram for forcing material from the cylinder, a core mounted in the second of the members in position to overlap the rim of the cylinder when the members are juxtaposed and form with the cylinder wall a thin orifice, a chamber in the second member surrounding the core for receiving material forced through the orifice, and a ram for forcing material from the chamber through runners cut in at least one of the juxtaposed surfaces and leading from the chamber to the cavities.

2. In an apparatus for molding plastic material, in combination, a pair of relatively movable members, said members having molding cavities formed in their juxtaposed surfaces, a transfer pot for receiving material to be molded, said pot opening to the juxtaposed surface of said members, a core that is positionable to nearly close the discharge end of the pot to form an annular discharge space, at least one of said members having runners of greater cross-sectional area than the discharge space cut in the juxtaposed surface and leading from the rim of the transfer pot to the cavities and means to force material from the pot to the cavities.

3. In an apparatus for molding plastic material, in combination, a pair of relatively movable members, said members having molding cavities formed in their juxtaposed surfaces, a transfer pot in one of the members, said pot opening to the juxtaposed surfaces, a core member fixed with respect to the other of the members, said core member cooperating with the rim of the transfer pot to form a thin orifice, said members being formed with a chamber surrounding the discharge end of the orifice, runners leading from the chamber to the cavities, and means for driving material from the pot to the cavities.

4. In an apparatus for molding plastic material, in combination, a pair of relatively movable members, said members having molding cavities formed in their juxtaposed surfaces, a transfer pot in one of the members, means for driving material from the pot, said pot opening to the juxtaposed surfaces, a core member fixed with respect to the other of the members, the core cooperating with the rim of the transfer pot to form a thin annular orifice, said members being formed with a chamber surrounding the core and with runners leading from the chamber to the cavities, and an annular ram surrounding the core for forcing material from the chamber and into the cavities.

5. In an apparatus for molding plastic material, in combination, a pair of superimposed relatively movable members, said members having molding cavities formed in their juxtaposed surfaces, a transfer pot in the lower of said members, means for driving material from the pot, said pot opening to the juxtaposed surface of the member, a core member fixedly mounted with respect to the upper of said members, said core member serving to obstruct the opening of the transfer pot when the members are juxtaposed in mold closed position, said upper member having a chamber surrounding the core, runners leading from the chamber to the cavities, and means for driving material from the chamber through said runners to the cavities.

KEITH W. HALL.

REFERENCES CITED

The following references are of record in the file of this patent:

UNITED STATES PATENTS

| Number | Name | Date |
| --- | --- | --- |
| 1,997,074 | Novotny | Apr. 9, 1935 |
| 2,156,396 | Macklin | May 2, 1939 |
| 2,319,439 | Burry | May 18, 1943 |
| 2,344,176 | Shaw | Mar. 14, 1944 |
| 2,359,840 | Goessling | Oct. 10, 1944 |

FOREIGN PATENTS

| Number | Country | Date |
| --- | --- | --- |
| 551,468 | Great Britain | Feb. 24, 1943 |